US008558892B2

(12) United States Patent
Brodsky et al.

(10) Patent No.: US 8,558,892 B2
(45) Date of Patent: Oct. 15, 2013

(54) OBJECT BLOCKING ZONES TO REDUCE FALSE ALARMS IN VIDEO SURVEILLANCE SYSTEMS

(75) Inventors: Tomas Brodsky, Croton on Hudson, NY (US); Yun-Ting Lin, White Plains, NY (US)

(73) Assignee: Honeywell International Inc., Morristown, NJ (US)

( * ) Notice: Subject to any disclaimer, the term of this patent is extended or adjusted under 35 U.S.C. 154(b) by 1148 days.

(21) Appl. No.: 10/969,720

(22) Filed: Oct. 20, 2004

(65) Prior Publication Data
US 2005/0157169 A1 Jul. 21, 2005

Related U.S. Application Data

(60) Provisional application No. 60/537,818, filed on Jan. 20, 2004.

(51) Int. Cl.
*H04N 7/18* (2006.01)

(52) U.S. Cl.
USPC .......................................... 348/155

(58) Field of Classification Search
USPC ................... 348/143, 152, 154, 159
See application file for complete search history.

(56) References Cited

U.S. PATENT DOCUMENTS

| 4,737,847 | A  | * | 4/1988  | Araki et al. ................ 348/161 |
| 5,825,412 | A  |   | 10/1998 | Hobson et al. |
| 5,937,092 | A  |   | 8/1999  | Wooton et al. |
| 5,956,424 | A  |   | 9/1999  | Wooton et al. |
| 6,069,655 | A  |   | 5/2000  | Seeley et al. |
| 6,104,831 | A  |   | 8/2000  | Ruland |
| 6,509,926 | B1 |   | 1/2003  | Mills et al. |
| 6,727,938 | B1 | * | 4/2004  | Randall ...................... 348/143 |
| 6,816,184 | B1 | * | 11/2004 | Brill et al. .................. 348/143 |
| 6,970,083 | B2 | * | 11/2005 | Venetianer et al. ......... 340/541 |
| 6,999,600 | B2 | * | 2/2006  | Venetianer et al. ......... 382/103 |
| 7,023,469 | B1 | * | 4/2006  | Olson ........................ 348/152 |
| 7,391,907 | B1 | * | 6/2008  | Venetianer et al. ......... 382/224 |
| 2002/0008758 | A1 | * | 1/2002  | Broemmelsiek et al. .... 348/143 |
| 2003/0025599 | A1 | * | 2/2003  | Monroe ...................... 340/531 |
| 2005/0078186 | A1 | * | 4/2005  | Kreiner et al. .............. 348/152 |
| 2005/0105765 | A1 | * | 5/2005  | Han et al. ................... 382/100 |

* cited by examiner

*Primary Examiner* — Mehrdad Dastouri
*Assistant Examiner* — Jeremaiah C Hallenbeck-Huber
(74) *Attorney, Agent, or Firm* — Husch Blackwell

(57) ABSTRACT

Blocking zones of a surveillance system are configured to prevent false alarms caused by motion within the zones, while allowing tracking of objects through the zones. An object that first appears within a blocking zone is not considered to be a reportable object until the object leaves the zone. All reportable objects are tracked, without regard to the blocking zones. Objects that remain within their initial blocking zone are not deemed to be reportable objects, and therefore do not generate alarms. If an object initially appears within overlapping zones, the object is not deemed to be reportable until it leaves each of the zones at least once. The blocking zones do not mask the video images, and thus a complete record of activity is available for forensic purposes.

31 Claims, 2 Drawing Sheets

OBJECT BLOCKING ZONES TO REDUCE FALSE ALARMS IN VIDEO SURVEILLANCE SYSTEMS

This application claims the benefit of U.S. Provisional Patent Application 60/537,818, filed 19 Jan. 2004.

BACKGROUND AND SUMMARY OF THE INVENTION

This invention relates to the field of surveillance systems, and in particular to a video surveillance system that includes blocking zones to reduce false alarms.

Video surveillance systems are commonly used to detect intruders in protected areas and/or to track objects that traverse protected areas. Generally, video images are processed to identify objects of interest, and to notify an operator of the system of any unauthorized ventures in the protected area. To facilitate an analysis of the potential unauthorized entry (forensics), the path of the object before and after the entry is provided to the operator.

Exclusion zones are commonly used in video surveillance systems to mask regions of the video image that should not be recorded for privacy reasons (see, for example, U.S. Pat. No. 6,509,926, "SURVEILLANCE APPARATUS FOR CAMERA SURVEILLANCE SYSTEM", issued 21 Jan. 2003 to Mills et al., and incorporated by reference herein), or to mask regions that trigger false alarms due to motion of trees, reflections, and so on (see, for example, U.S. Pat. No. 5,956,424, "LOW FALSE ALARM RATE DETECTION FOR A VIDEO IMAGE PROCESSING BASED SECURITY ALARM SYSTEM", issued 21 Sep. 1999 to Wootton et al., and incorporated by reference herein; see also U.S. Pat. No. 6,069,655, "ADVANCED VIDEO SECURITY SYSTEM", issued 30 May 2000 to Seeley et al., and incorporated by reference herein).

A problem with conventional exclusion regions is that the video image within the region is masked, so that any and all activity within the region is indiscriminately blocked from view and/or analysis. A user may use an exclusion region to mask a cluster of trees, to prevent false alarms caused by motion of the trees, but if a person or automobile travels in front of these trees, their motion will also be masked from generating an alarm.

FIGS. 1A and 1B illustrate example camera views from a video surveillance system.

In FIG. 1A, the area in front of an entrance 120 to a secured building 110 is monitored. The example area includes trees 130. In a conventional surveillance system, one or more exclusion regions would typically be defined to mask the trees 130, so that movements of the leaves or branches of the trees 130 are not tagged as reportable events. Such masking, however, will also mask the movement of a person 140 in the vicinity of the trees 130, thereby producing a potential security gap in the surveillance of the area.

In FIG. 1B, a section of a room is monitored. The room includes a doorway 160, and a mirror 150. When the door is open, any activity in the hallway is visible, including, for example, a person 170 walking by the door. In a conventional surveillance system, an exclusion zone may be defined to mask the activity at the doorway 160, but in so doing, the recognition of a person entering the room is delayed until the person is beyond the masked area. In like manner, an exclusion zone will typically be defined to cover all mirrors or windows, to mask reflections of a person 180 at the opposite end of the room, or persons beyond the secured premises. If a person walks in front of the masked mirror 150, however, a substantial amount of the person's image will be masked, and object-detecting algorithms may fail to identify the remainder image as a trackable object.

An object of this invention is to provide a scheme that facilitates the advantages provided by exclusion zones without incurring their inherent disadvantages. Another object of this invention is to provide a continuous record of an object's travel for forensic purposes.

These objects, and others, are achieved by a method and system that employs blocking zones that are configured to prevent false alarms caused by motion within the zones, but also allow the tracking of objects through the zones. An object that first appears within a blocking zone is not considered to be a reportable object until the object leaves the zone. All reportable objects are tracked, without regard to the blocking zones. Objects that remain within their initial blocking zone are not deemed to be reportable objects, and therefore do not generate alarms. If an object initially appears within overlapping zones, the object is not deemed to be reportable until it leaves each of the zones at least once. The blocking zones do not mask the video images, and thus a complete record of activity is available for forensic purposes.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION OF THE INVENTION

Figure 1A:
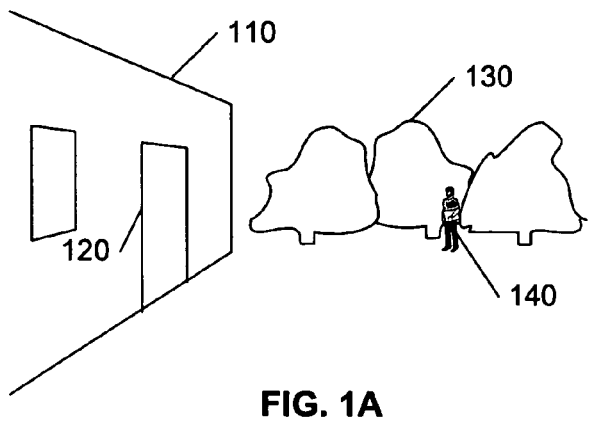
FIGS. 1A and 1B illustrate example views provided by a video surveillance system.
Figure 1B:
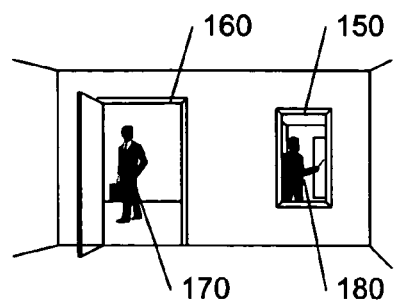
Figure 2A:
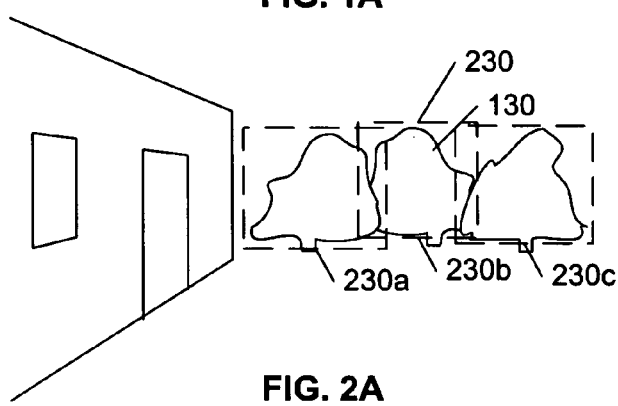
FIGS. 2A and 2B illustrate example camera fields of view with blocking zones in accordance with this invention.
Figure 2B:
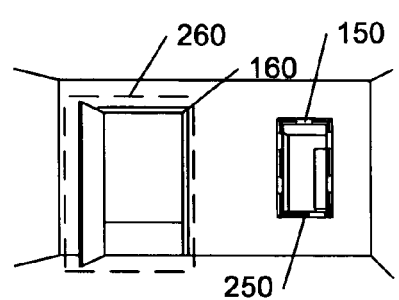

FIGS. 2A and 2B illustrate example camera fields of view with blocking zones in accordance with this invention. FIG. 2A corresponds to FIG. 1A, and illustrates blocking zones 230a, 230b, 230c (collectively 230) surrounding each tree 130. FIG. 2B corresponds to FIG. 1B, and illustrates blocking zones 260, 250 encompassing the doorway 160 and mirror/window 150. These blocking zones are illustrated as rectangles, although one of ordinary skill in the art will recognize that the shape of the zone is immaterial to the principles of this invention. In a preferred embodiment of this system, a graphic interface is provided, wherein a reference image corresponding to a field of view of a camera is presented to a user, and the user identifies the bounds of each blocking zone by "drawing" each blocking zone on the reference image. From the user's drawing, the coordinates of the bounding vertices of the blocking zone are determined and stored.

Preferably, each blocking zone 230, 250, 260 is sufficiently sized to include the extent of motion of objects that may appear within the zone but may not constitute reportable motion. That is, a blocking zone 260 is typically associated with a relatively stationary object that exhibits some movement, such as a tree that sways, or a door that swings in a doorframe, and generally encompasses the extent of the movement. For example, the blocking zone 260 about the doorframe 160 includes the extent of the swing of the door, so as to potentially exclude the motion of the door from the reportable motion. A blocking zone 260 is also typically associated with segments of an image within which inconsequential/immaterial movement may occur, such as views through a window or doorway to an area beyond the secured area, movements within a mirror image, and so on.

In a preferred embodiment of this invention, the blocking zone 260 is defined relative to a given view of the camera, rather than relative to the display screen. In this manner, if the view of the camera changes, such as via the use of a pan-tilt-zoom (PTZ) camera arrangement, the blocking zone 260 will retain its relationship to the object to which it is associated, such as the doorframe 160.

Figure 3:
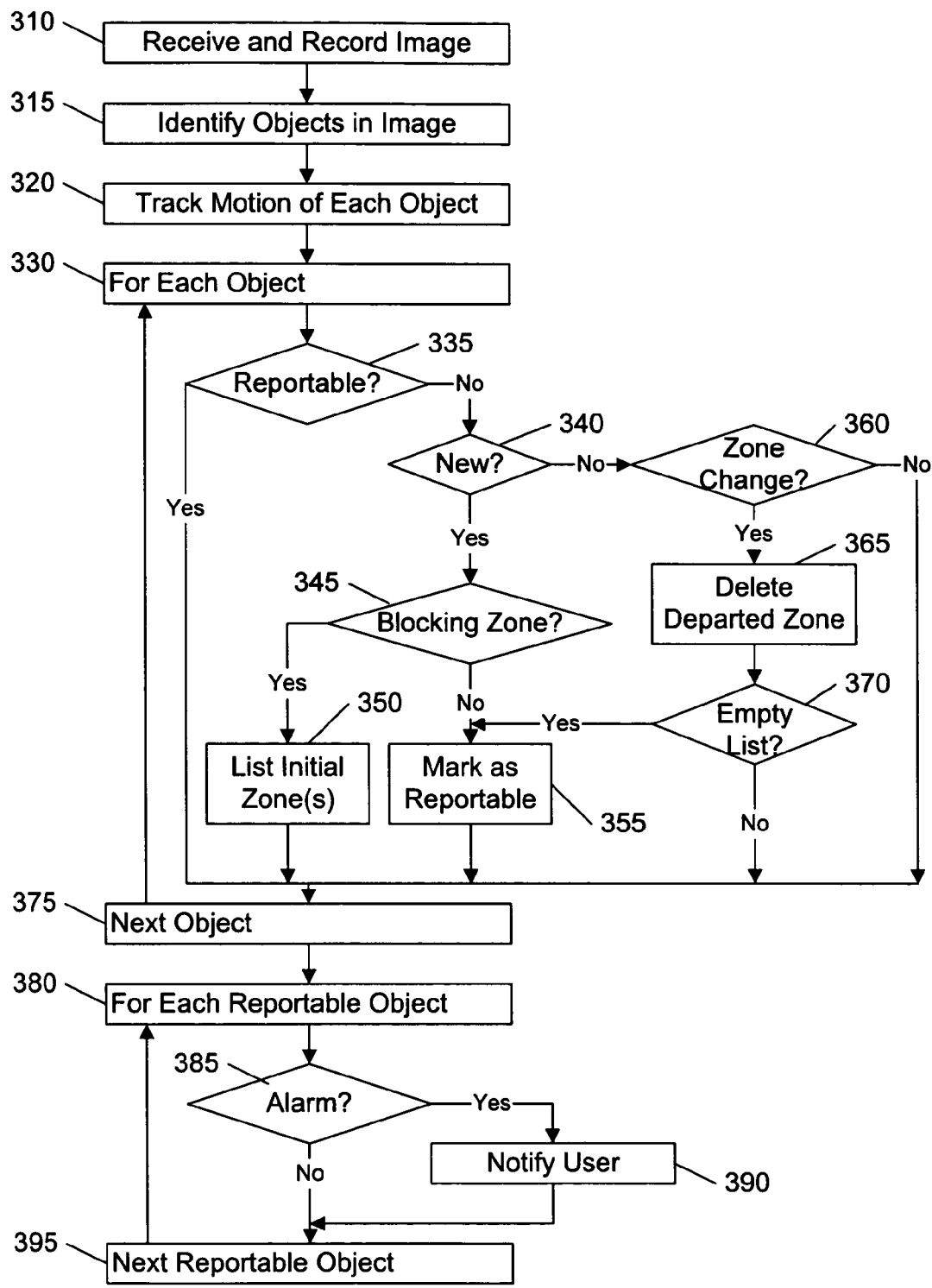
FIG. 3 illustrates a flow diagram of an example surveillance system in accordance with this invention.

FIG. 3 illustrates an example flow diagram of a surveillance system including a computer processor and a computer program stored on a computer memory that operates on the processor and that includes blocking zones in accordance with this invention. For ease of understanding, this invention is described with reference to a single camera surveillance system, although one of ordinary skill in the art will recognize that the principles of this invention are not limited to a single camera system.

At 310, an image is received from a camera, and optionally recorded. This image may be processed before recording, to reduce storage requirements; for example, the image may be converted into an MPEG format and stored in this form. In like manner, the image may be processed to facilitate subsequent operations or processes that use the image. For example, stationary background images may be subtracted from the current image, to highlight foreground objects. Similarly, some image processing may be applied to reduce the effects caused by varying lighting or other environmental changes. Optionally, the recording of the images from the camera may be postponed until some suspicious activity is detected, or until some alarm is signaled.

At 315, the image is processed to identify potential objects of interest, using techniques common in the art. For example, to qualify as an object of interest, identified clusters of pixels may need to be at least some minimum size, some reasonable shape, and so on.

At 320, the track, or path, of each identified object of interest is recorded, using techniques common in the art. If the object is newly identified, a track is created for this object. If the object is determined to correspond to an object in prior images, the current location of the object is concatenated to the existing track. Optionally, only the track of each reportable object (detailed below) is recorded; but, because the storage requirements for tracking is relatively insubstantial, all detected objects are tracked. If an object disappears from view without having been declared reportable (detailed below), the track of that object is deleted. Also optionally, albeit less efficient, if the track of a non-reportable object is not recorded, when the object is determined to be a reportable object, the recorded images can be used to "backtrack" the path of the reportable object to create a complete track of the object's movements.

The loop 330-375 processes each object, using the aforementioned blocking zones of this invention. For ease of presentation and explanation, all regions of a scene are considered to correspond to one or more zones, and these zones include both blocking and non-blocking zones. Blocking zones may overlap, so that an object can be located in more than one zone at any given time; a non-blocking zone is defined as any region that does not include a blocking zone.

At 335, the status of the object is checked. All objects are initially marked as being non-reportable. If the object has previously been deemed to be reportable, no further processing is required for this object.

If, at 340, the non-reportable object is a new object, the initial status of the object is determined, at 345-355. If, at 345, the new object is located within one or more blocking zones, a list of the initial blocking zones that include this new object is created, at 350. If, on the other hand, at 345, the new object is located in a non-blocking zone, the object is marked as being reportable.

If, at 340, the non-reportable object is not a new object, the object's prior zone(s) is checked, at 360, to determine whether a zone-change has occurred. A zone-change is defined herein as a movement/transfer of an object from one zone into another zone. If the object, for example, transfers from a blocking zone to a non-blocking zone, or from a set of multiple zones into a single zone, or into a different set of multiple zones, a zone-change has occurred. If an object merely disappears from a zone, and does not appear in another zone, a zone-change has not occurred. (One of ordinary skill in the art will recognize that if an object disappears and does not appear in another zone, it will not be identified as an object in 315, and hence will not be included in the loop 330-375. The prior statement is included in the event that this invention is embodied differently from the flow diagram of FIG. 3.)

If a zone change has not occurred, at 360, no further processing is required, and the object remains as a non-reportable object. If, on the other hand, at 360, a zone change has occurred, the zone or zones from which the object has departed is/are removed from the list of initial blocking zones that was created at 350. If, at 370, this deletion results in an empty list of blocking zones, the object is marked as reportable, at 355; otherwise, if there remains at least one blocking zone in the list associated with the object, the object remains non-reportable.

Consider the following examples.

If an object initially appears outside all blocking zones, the object is deemed to be a reportable object, at 355.

If an object initially appears within a single blocking zone, such as a blocking zone that includes a mirror or window, the single blocking zone is included in the list of blocking zones associated with the object, at 350. If the object eventually disappears from the single blocking zone and reappears in another zone, the single blocking zone is removed from the list, the list is determined to be empty, and the object is deemed to be a reportable object. Note that if the object is merely a reflection in a mirror, or an image outside a window, and the initial blocking zone includes the mirror or window, the list associated with this object will never be depleted, because the object will not undergo a zone-change, at 360, and its status as a non-reportable object will not change. If, on the other hand, the object is a person standing in front of the mirror or window, the object will be deemed to be reportable, at 355, as soon as the object leaves the blocking zone surrounding the mirror or window, at 360-365.

If an object initially appears in a set of overlapping blocking zones, such as the overlap of blocking zones 230a and 230b in FIG. 2A, the list associated with the object will contain blocking zones 230a and 230b. If the object moves to the right, and leaves zone 230a, this zone, 230a, will be removed from the list of initial blocking lists that was created at 350 of FIG. 3. At this point, the list will still contain blocking zoned 230b, and thus will not be empty, and the status of the object will remain as non-reportable, at 370. If the object continues to move to the right, or turns around and travels to the left, and eventually also leaves blocking zone 230b, then zone 230b is removed from the list, the list is determined to be empty, and the object is deemed to be reportable. On the other hand, if the object is a branch of one of the trees in zones 230a, 230b that appears in the overlap of 230a, 230b, it will not be deemed to be reportable unless it travels beyond 230a and also travels beyond 230b, which is highly unlikely if the zones are properly defined. Thus, branches swaying within the overlay area and somewhat beyond will not be deemed to be reportable, whereas a person who appears in the overlay area and eventually moves beyond the overlap areas 230a, 230b will be identified as a reportable object.

Note that the list that is used to determine whether a non-reportable object becomes a reportable object is created when the object is initially identified within one or more blocking zones, and the only actions on this list are potential deletions. Once the list becomes empty, the object is declared to be reportable, and thereafter the blocking zones have no effect on the tracking of the reportable objects. In this manner, the masking effects provided by the conventional exclusion zones is effectively provided for objects that never travel beyond their original blocking zone, whereas, as contrast to the conventional exclusion zones, the blocking zones have no effect on objects that travel beyond their initial blocking zones, or objects that initially appeared outside of a blocking zone.

The loop 380-395 assesses each reportable object to determine whether to sound an alarm, at 385-390, using techniques common in the art. Because only reportable objects are assessed, non-reportable objects, such as reflections in mirrors, swaying branches, and the like that remain within their initial blocking zone do not generate false alarms.

Figure 4:
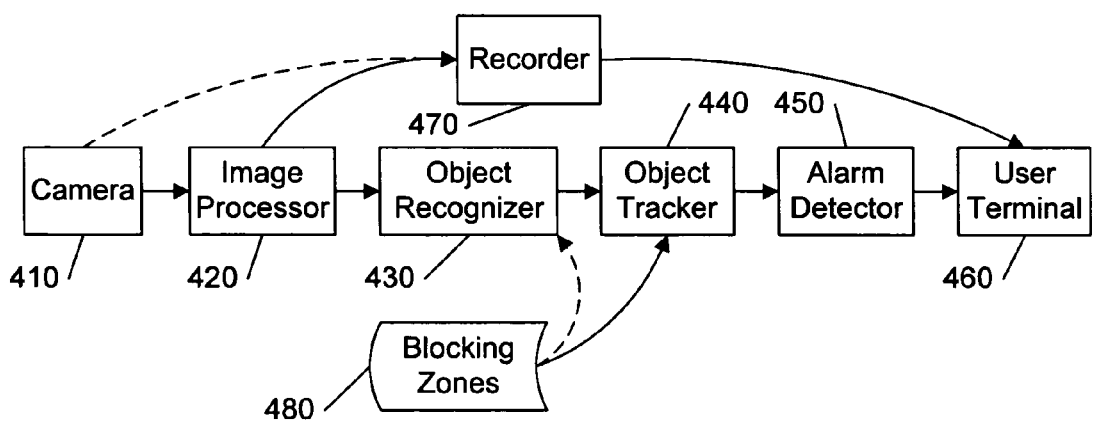
FIG. 4 illustrates a block diagram of an example surveillance system in accordance with this invention.

For completeness, FIG. 4 illustrates an example surveillance system in accordance with this invention. One or more cameras 410 provide images to an image processor 420. The images are also provided to a recorder 470, in either their original form or in a processed formed, such as an MPEG encoding. The image processor 420 optionally pre-processes the images to facilitate the recognition of objects within each image, for example, by subtracting a stationary background image from each image.

An object recognizer 430 receives the images from the image processor 420, and identifies potentially reportable objects, using conventional techniques such as recognition based on size and/or shape of groups of adjacent pixels exhibiting common motion. An object tracker 440 records the track or path of each identified object.

The object tracker 440 also distinguishes between reportable objects and non-reportable objects, based on whether each object that initially appears within a blocking zone 480 eventually leaves the blocking zone 480, as detailed above. The object tracker 440 provides the identification and track of each reportable object to an alarm detector/processor 450, for subsequent notification to a user terminal 460 of any potential or actual alarm conditions.

The foregoing merely illustrates the principles of the invention. It will thus be appreciated that those skilled in the art will be able to devise various arrangements which, although not explicitly described or shown herein, embody the principles of the invention and are thus within its spirit and scope. For example, one of ordinary skill in the art will recognize that the object tracking, at 320 in FIG. 3, could be limited to the tracking of reportable objects, by placing the tracking process after the loop 330-375. Similarly, in FIG. 4, the object recognizer 430 could be configured to only report reportable objects to the object tracker 440. In like manner, the detection of a zone-change at 360 in FIG. 3 could be limited to a comparison of the current zone of the object to the list of initial blocking zones to determine whether the object has departed the initial zones. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts is intended to be required unless specifically indicated.

We claim:

1. A surveillance method of a protected area implemented within a surveillance system comprising:
a graphic user interface presenting a reference image of a portion of the protected area to a user, the portion corresponding to a field of view of the protected area from a camera;
identifying a set of bounds of a relatively stationary object within the protected area that exhibits some inconsequential or immaterial movement from a drawing provided on the reference image by the user through the graphic user interface;
defining a set of vertices of a blocking zone within the protected area around the relatively stationary object from the drawing;
obtaining an image of the protected area from the camera; the surveillance system detecting an object image;
the surveillance system identifying the detected object as being non-reportable if the object is initially detected completely within the defined blocking zone of the image;
the surveillance system identifying the detected object as being reportable if the object is initially detected beyond the defined blocking zone of the image and within the protected area;
the surveillance system obtaining subsequent images from the camera;
the surveillance system detecting the object within the subsequent images; the surveillance system tracking the detected object within the blocking zone
the surveillance system identifying the detected object as being reportable from the detected subsequent images if the detected object departs the defined blocking zone of the image and is still located within the protected area beyond the defined blocking zone of the image
wherein an alarm is generated for reportable objects and
wherein after the object is identified as reportable the object can not be subsequently identified as being non-reportable and will continue to generate an alarm, even if the object enters a blocking zone.

2. The surveillance method of claim 1, further including: identifying the object based on a size of a group of pixels within the video images that exhibit a correlated motion through the sequence of video images.

3. The surveillance method of claim 1, wherein the blocking zone is defined to correspond to an image of a relatively stationary object that exhibits movement within a defined space.

4. The surveillance method of claim 1, wherein the blocking zone is defined to correspond to an image of a passageway within which transient objects may appear without appearing beyond the image of the passageway.

5. The surveillance method of claim 1, wherein the blocking zone is defined to correspond to an image of a reflective surface.

6. The surveillance method of claim 1, wherein the object is initially identified as being locating within a plurality of blocking zones, and identifying the object as reportable only if the object is detected to have been located beyond each of the plurality of blocking zones in the subsequent images.

7. The surveillance method of claim 1, further including determining whether to notify a user of the object that is identified as being reportable.

8. The surveillance method of claim 1, further including tracking motion of the object that is identified as being reportable.

9. The surveillance method of claim 1, further including recording the images independent of the blocking zone.

10. The surveillance method of claim 1, further including adjusting a relative location of the blocking zone within the image as the image is modified by a change of view of a device that provides the image.

11. A surveillance system for a protected area that comprises:
   an object recognizer that is configured to recognize an object in a sequence of images of the protected area,
   an object tracker that is configured to track a path of the object;
   a graphic interface that presents a reference image of a portion of the protected area to a user, the portion corresponds to a field of view of a camera, the user identifies one or more blocking zones within the protected area by drawing the one or more blocking zones on the reference image, the one or more blocking zones each define select regions within the images containing a relatively stationary object that exhibits some inconsequential or immaterial movement; and
   an alarm processor;
   wherein the object tracker is configured to:
   identify the recognized object as being non-reportable if the object is initially recognized as being completely within a blocking zone of the one or more blocking zones,
   identify the recognized object as being reportable if the object is initially recognized as being beyond the blocking zones,
   track the recognized object within the one or more blocking zones, and
   identify the recognized object as being reportable if the object departs the blocking zone and remains within the protected area; and
   the alarm processor is configured to limit notification of activity to recognized objects that are identified as being reportable
   wherein an alarm is generated for reportable objects and
   wherein after the object is identified as reportable the object can not be subsequently identified as being non-reportable and will continue to generate an alarm, even if the object enters a blocking zone.

12. The surveillance system of claim 11, further comprising: one or more cameras that are configured to provide the images.

13. The surveillance system of claim 11, further comprising: one or more recorders that are configured to record the images.

14. The surveillance system of claim 13, wherein the one or more recorders record the images independent of the blocking zone.

15. The surveillance system of claim 11, wherein the object tracker is further configured to:
   determine whether the object is initially recognized as being in one or more other blocking zones, and
   identify the object as being reportable only if the object also departs each of the one or more other blocking zones.

16. The surveillance system of claim 11, wherein the blocking zone includes an associated image region that includes at least one of:
   a relatively stationary object that exhibits movement,
   a passageway within which transient objects may appear, and a reflective surface.

17. The surveillance system of claim 16, further including at least one camera that provides the images, wherein the at least one camera provides a controllable field of view, and the object tracker is further configured to adjust a relative location of the blocking zone in the images so as to maintain a correspondence with the associated image region upon a change of the field of view of the at least one camera.

18. A computer program stored on a computer memory that, when executed on a processing device, causes the processing device to:
   presenting a reference image on a graphic interface to a user, the reference image is a portion of a protected area associated with a field of view of a camera;
   identifying a defined blocking zone within the field of view from a drawing on the reference image of the graphic interface provided by the user, the defined blocking zone is drawn to include an extent of motion at least one relatively stationary object that exhibits some inconsequential or immaterial movement;
   detecting an object within a first image of a protected area from a camera, identifying the detected object as being non-reportable if the object is initially detected completely within the defined blocking zone within the protected area and within a field of view of the camera that includes the first image,
   identifying the recognized object as being reportable if the object is initially detected beyond the defined blocking zone,
   detecting the object within a second image from the camera,
   tracking the detected object within the defined blocking zone, and
   identifying the tracked object as being reportable if the tracked object in the subsequent image is located beyond the defined blocking zone yet still within the protected area
   wherein an alarm is generated for reportable objects and
   wherein after the object is identified as reportable the object can not be subsequently identified as being non-reportable and will continue to generate an alarm, even if the object enters a blocking zone.

19. The computer program of claim 18, that further causes the processing device to accept input from a user to create the defined blocking zone.

20. The computer program of claim 19, wherein accepting input from the user includes identifying coordinates that bound the blocking zone within a reference image corresponding to the field of view of the camera.

21. The computer program of claim 18, that further causes the processing device to notify a user of the object when the object is identified as being reportable.

22. The computer program of claim 18, that further causes the processing device to track a path of the object.

23. The computer program of claim 1, further causes the processing device to adjust a location of the defined blocking zone relative to the field of view as the field of view changes.

24. The computer program of claim 18, that further causes the processing device to record at least the first image and the second image.

25. A method implemented within a computer comprising:
    the computer presenting a reference image on a graphic interface to a user, the reference image is a portion of a protected area associated with a field of view of a camera;
    the computer identifying one or more defined blocking zones within the field of view from a drawing provided by the user on the reference image of the graphic interface, the one or more defined blocking zones each drawn to include an extent of motion of at least one relatively stationary object within the reference image that exhibits some inconsequential or immaterial movement;
    the computer obtaining images of a protected area from a camera, each image including the one or more defined blocking zones within the protected area,
    the computer detecting a moving object within the images regardless of the defined blocking zones,
    defining a classification for each of the detected objects, the classification including reportable and non-reportable, based on whether the detected object is completely within the one or more blocking zones,
    the computer tracking the detected object within the one or more blocking zones, and
    the computer reporting the detected object whenever the object is beyond the one or more blocking zones yet still within the protected area
    wherein after the object is defined as being reportable, the object can not be subsequently identified as being non-reportable
    including providing an alarm based on a location of each object that is classified as being reportable and continuing to provide the alarm even if even if the object enters a blocking zone, preventing the alarm for all objects that are classified as non-reportable.

26. The method of claim 25, wherein defining the classification of each object includes defining the object as being reportable if the object is initially detected outside all of the defined blocking zones.

27. The method of claim 26, wherein defining the classification of each object includes defining the object as being non-reportable if the object is initially detected inside at least one of the defined blocking zones.

28. A surveillance system that comprises:
    an object recognizer that is configured to recognize a target object in a sequence of images of a protected area,
    a graphic interface that presents a reference image of a portion of the protected area to a user, the portion corresponds to a field of view of a camera, the user identifies one or more blocking zones by drawing the one or more blocking zones on the reference image of the graphic interface, the one or more blocking zones define select regions of the protected area within the images, said one or more blocking zones are each drawn about a respective relatively stationary object that exhibits some inconsequential or immaterial movement,
    an object tracker that is configured to track a path of the recognized target object within the one or more blocking zones, and to classify the recognized target object as being reportable or non-reportable, based on whether the recognized target object is completely within the one or more blocking zones,
    wherein after the object is identified as reportable, the object can not be subsequently identified as being non-reportable
    an alarm processor that is configured to limit notification of activity to recognized target objects that are classified as being reportable whenever a recognized target object is outside the one or more blocking zones yet still within the protected area and continuing to generate the alarm even if even if the object enters a blocking zone.

29. The surveillance system of claim 28, wherein the object tracker is configured to classify the target object as reportable if the target object is initially detected outside each of the one or more blocking zones.

30. The surveillance system of claim 28, wherein the object tracker is configured to classify the target object as non-reportable if the target object is initially detected within at least one of the one or more blocking zones.

31. The surveillance system of claim 30, wherein the object tracker is further configured to classify the object as being reportable if the object is subsequently detected outside each of the one or more blocking zones.

* * * * *